United States Patent
Chen et al.

(10) Patent No.: US 10,308,007 B2
(45) Date of Patent: Jun. 4, 2019

(54) MASK VIDEO PROJECTION BASED STEREOLITHOGRAPHY WITH CONTINUOUS RESIN FLOW

(71) Applicant: University of Southern California, Los Angeles, CA (US)

(72) Inventors: Yong Chen, La Canada, CA (US); Huachao Mao, Los Angeles, CA (US); Xiangjia Li, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 200 days.

(21) Appl. No.: 15/187,713

(22) Filed: Jun. 20, 2016

(65) Prior Publication Data
US 2016/0368210 A1   Dec. 22, 2016

Related U.S. Application Data

(60) Provisional application No. 62/181,632, filed on Jun. 18, 2015.

(51) Int. Cl.
| | |
|---|---|
| *B29C 64/124* | (2017.01) |
| *B33Y 50/02* | (2015.01) |
| *B33Y 30/00* | (2015.01) |
| *B29C 64/135* | (2017.01) |
| *B29C 64/20* | (2017.01) |

(Continued)

(52) U.S. Cl.
CPC ............ *B33Y 50/02* (2014.12); *B29C 64/135* (2017.08); *B29C 64/20* (2017.08); *B29C 64/386* (2017.08); *B33Y 30/00* (2014.12); *B29C 64/129* (2017.08); *B29C 64/241* (2017.08); *B29C 64/255* (2017.08); *B29C 64/277* (2017.08); *B29C 64/286* (2017.08)

(58) Field of Classification Search
CPC . B29C 67/0066; B29C 64/106; B29C 64/124; B29C 64/129; B29C 64/236; B29C 64/241; B29C 64/255; B29C 64/277; B29C 64/286; B29C 64/386; B29C 64/393; B33Y 10/00; B33Y 30/00; B33Y 50/02
USPC ................ 425/174.4, 375, 162; 264/308
See application file for complete search history.

(56) References Cited

U.S. PATENT DOCUMENTS

| | | |
|---|---|---|
| 9,120,270 B2 | 9/2015 | Chen et al. |
| 9,205,601 B2 | 12/2015 | DeSimone et al. |

(Continued)

*Primary Examiner* — Joseph S Del Sole
*Assistant Examiner* — Lawrence D. Hohenbrink, Jr.
(74) *Attorney, Agent, or Firm* — Fish & Richardson P.C.

(57) ABSTRACT

Methods, systems, and apparatus including medium-encoded computer program products for performing additive manufacturing (AM) using continuous resin flow based mask video projection stereolithography (MVP-SL) According to an aspect, a system for additive manufacturing of an object in three dimensions consisting of an X dimension, a Y dimension, and a Z dimension, the system comprising: a tank configured to contain a liquid resin; a first translation stage coupled with the tank, the first translation stage being configured to move the tank in the X dimension, the Y dimension, or both; a second translation stage coupled with a build platform, the second translation stage being configured to move the build platform in the Z dimension; and a computer control system to cause the second translation stage to elevate the build platform in the Z dimension simultaneously with causing the first translation stage to perform the sliding motion.

16 Claims, 6 Drawing Sheets

(51) Int. Cl.
  *B29C 64/386* (2017.01)
  *B29C 64/277* (2017.01)
  *B29C 64/129* (2017.01)
  *B29C 64/255* (2017.01)
  *B29C 64/286* (2017.01)
  *B29C 64/241* (2017.01)

(56) References Cited

U.S. PATENT DOCUMENTS

| | | |
|---|---|---|
| 9,211,678 B2 | 12/2015 | DeSimone et al. |
| 9,216,546 B2 | 12/2015 | DeSimone et al. |
| 9,360,757 B2 | 6/2016 | DeSimone et al. |
| 2013/0295212 A1* | 11/2013 | Chen ................ B29C 67/0088 425/150 |
| 2016/0046072 A1* | 2/2016 | Rolland ................ B33Y 10/00 264/401 |

* cited by examiner

MASK VIDEO PROJECTION BASED STEREOLITHOGRAPHY WITH CONTINUOUS RESIN FLOW

CROSS REFERENCE TO RELATED APPLICATIONS

This application claims priority to U.S. Provisional Application Ser. No. 62/181,632, entitled "MASK VIDEO PROJECTION BASED STEREOLITHOGRAPHY WITH CONTINUOUS RESIN FLOW FOR BUILDING DIGITAL MODELS IN MINUTES", filed Jun. 18, 2015. In addition, this application is related to U.S. patent application Ser. No. 13/872,954, entitled "DIGITAL MASK-IMAGE-PROJECTION-BASED ADDITIVE MANUFACTURING THAT APPLIES SHEARING FORCE TO DETACH EACH ADDED LAYER", filed Apr. 29, 2013, and now U.S. Pat. No. 9,120,270 issued on Sep. 1, 2015. Both of these prior applications are hereby incorporated by reference.

BACKGROUND

The present disclosure relates to three dimensional (3D) printing, or additive manufacturing (AM), including continuous resin flow based mask video projection stereolithography (MVP-SLA).

Current AM, or 3D printing, techniques depend on accumulation of materials layer by layer. The fabrication speed is limited by the recoating speed (i.e., adding fresh resin for each layer). Hence the layer-based AM process may spend much of the time in waiting for the platform or tank movements during the building process. In current AM techniques utilizing a SLA, the resin filling process can take up much more than half of the fabrication time.

FIG. 1A shows an example of a mask image projection based MIP-SLA apparatus 100. Some existing AM processes employing MIP-SLA can be used to address speed limitations associated with typical laser based SLAs. A MIP-SLA 100 can be employed to fabricate a model using layer-by-layer additive techniques in a MIP-SLA process, for example. As an example illustrated in FIG. 1A, the apparatus 100 can use light, such as ultraviolet (UV) light, that is emitted from a light source 101 and then reflected by a Digital Micromirror Device (DMD) 102, to be transmitted through the lens 104 of an optical system and subsequently to the liquid resin surface 105. In some embodiments, the light source 101 can be implemented as a light emitting diode (LED). The MIP-SLA apparatus 100 can include a tank 110 that can be utilized as a large container to hold, or otherwise maintain, the liquid resin 106 and for keeping the liquid resin surface 105 leveled while stationary, for example. The focusing mask image provides sufficient energy to cure the portion of liquid resin 106 that is associated with the exposure into a solid. A portion of the liquid resin 106 can be solidified in the shape of a two-dimensional image projected by the DMD 102. The DMD 102 can be designed to include over a million mirrors, and thereby producing a projection mask image having relatively high resolution in speeds that are much faster in comparison to laser-based SLA technologies. After curing a thin layer of liquid resin 106 to fabricate a layer of the built physical model 107, which can be a 3D printed object for instance, the Z linear stage 108 can perform movement along a Z axis, namely in the vertical direction (e.g., move up or move down), to refresh the liquid resin 106 such that the resin for the next layer can be prepared. Additionally, a platform 111 can move, after a previous layer has been cured, in order to spread liquid resin 106 into a uniformly thin layer for recoating the next layer. In layer-based AM techniques the process can be repeated until the entire built physical model 107 is completely fabricated. The building of each layer may require a full cyclic motion including both moving the platform 111 up and down in the Z axis, and moving the tank 110 back and forth in the X axis.

SUMMARY

The present disclosure relates to 3D printing, or AM, including continuous resin flow based MVP-SLA.

In general, one or more aspects of the subject matter described in this specification can be embodied in one or more systems that include: a tank configured to contain a liquid resin, the tank comprising a window in a bottom portion of the tank; a first translation stage coupled with the tank, the first translation stage being configured to move the tank in the X dimension, the Y dimension, or both; a build platform configured to be located within the tank for at least an initial portion of building a part; a second translation stage coupled with the build platform, the second translation stage being configured to move the build platform in the Z dimension; a light projection device configured to emit light through the window and into the tank to cure the liquid resin; and a computer control system comprising at least one hardware processor and a storage device coupled with the hardware processor, the computer control system being coupled with the first translation stage to control movement of the tank, the computer control system being coupled with the second translation stage to control movement of the build platform; the computer control system being coupled with the light projection device to control emission of the light; and the storage device encoding a program configured to cause the computer control system to cause the light projection device to emit the light into the tank to cure the liquid resin to manufacture the part on the build platform, cause the first translation stage to perform a sliding motion of the tank simultaneously with causing the light projection device to emit the light into the tank, and cause the second translation stage to elevate the build platform in the Z dimension simultaneously with causing the first translation stage to perform the sliding motion.

In general, one or more aspects of the subject matter described in this specification can be embodied in one or more methods that include: receive a digital model usable for fabricating an object in three dimensions; calculate a maximum projection distance associated with a light emitted into a tank to convey the digital model and cure liquid resin in fabricating the object in three dimensions; determine a first speed usable for controlling a sliding movement of a first translation stage coupled with the tank and a second speed usable for controlling an elevation movement of a second translation stage coupled with a build platform, wherein the determination is based on the calculated maximum projection speed; and cause the first translation stage to perform the sliding movement of the tank and the elevation movement of the build platform in accordance with the first speed and the second speed respectively, and both movements performed as continuous motion synchronized with each other to continuously move the liquid resin.

Particular embodiments of the subject matter described in this specification can be implemented to realize one or more of the following advantages. The systems and techniques described provide a combination of continuous resin flow and synchronized rotary and linear motions of translation stages, thereby creating an AM technique with increased accumulation speeds for each layer of a fabricated part. 3D printing technology implemented using MVP-SLA techniques described employ high projection rates associated with video as compared with singular images, and can realize substantially faster fabrication than some existing mask-image-projection based SLA and laser-based SLA technologies. The systems and techniques described utilize a two-stage movement approach that leverages continuous resin flow so as to actively feed resin to exposure areas, thus reducing delays in resin filling aspects of fabrication. A resin coating speed can be significantly accelerated in accordance with the continuous resin flow aspects described, and provides AM techniques that can sustain high speeds associated with mask image projection. The systems and techniques described can realize improvements in speed and efficiency of some existing 3D technologies that rely on resin filled by gravity and surface tension for recoating during fabrication of AM built parts.

The above and other aspects and embodiments are described in greater detail in the drawings, the description and the claims.

DESCRIPTION OF DRAWINGS

Like reference numbers and designations in the various drawings indicate like elements.

DETAILED DESCRIPTION

Figure 1A:
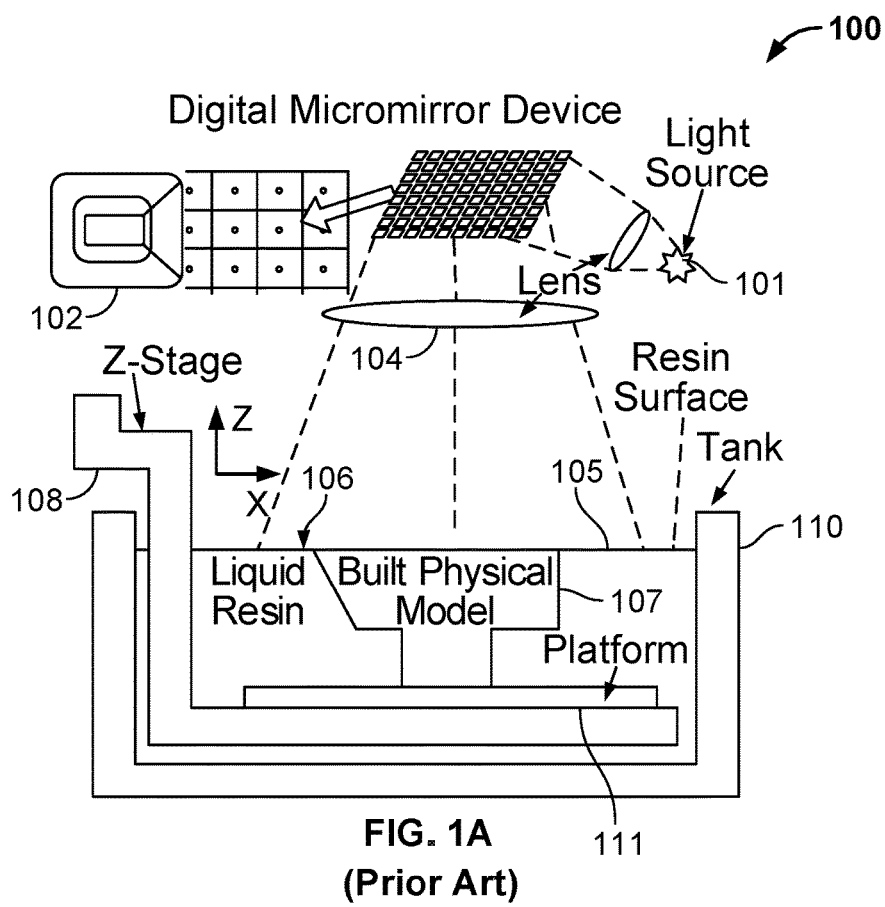
FIG. 1A shows an example of a system employed for implementing MIP-SLA techniques.

Various embodiments are now discussed and illustrated. Other embodiments may be used in addition or instead. Details which may be apparent or unnecessary may be omitted to save space or for a more effective presentation. Conversely, some embodiments may be practiced without all of the details which are disclosed.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification are approximate, not exact. They are intended to have a reasonable range which is consistent with the functions to which they relate and with what is customary in the art to which they pertain. In addition, all articles, patents, patent applications, and other publications which have been cited are hereby incorporated herein by reference.

In this disclosure, a continuous resin flow based mask video projection process employed for 3D printing is introduced. A mask video projection process (e.g., 30-120 images/sec) can be combined with a continuous resin flow by use of rotary and linear motions, for example, such that each layer of a 3D printer manufactured item can be accumulated at speed that is comparatively increased (e.g., 0.01 sec/layer) to existing 3D printing technologies that are available in the market. For example, the disclosed continuous resin flow based mask video projection process can be 5-10× faster than some existing mask-image-projection based stereolithogrpahy (SLA) approaches and 100× faster than previous laser-based SLA processes.

Current addive manufacturing, or 3D printing, techniques can depend on a layer-by-layer based accumulation of materials. Thus, the fabrication speed is limited by the recoating speed (i.e., adding fresh resin for next layers). Hence, layer-based AM techniques can experience delays associated with time in waiting for platform or tank movements during the building process. As an example, in some current SLA processes, the resin filing process can take up much more than half of the fabrication time. In existing mask-image-projection based SLA machines that are developed by companies such as 3D Systems, FormLab, and EnvisionTec, the resin flows to the exposure are passive, that is, the liquid resin can be mainly filled by gravity or surface tension, which are slow and cannot match pace with the speed of mask image projection. However, in the systems and techniques described, a continuous motion between the resin tank and platform of an AM device, such as a 3D printer, is employed that can actively feed resin to the exposure area, thereby effectuating a continuous resin flow. Therefore, compared to passive resin flow processes, the resin coating speed can be significantly accelerated and thus provides a recoating process fast enough to sustain operation with mask image projection speeds (e.g., reduce recoating delays). That is, the continuous resin flow based mask video projection process of the embodiments, can fabricate models with significantly reduced manufacturing delays. For instance, the described techniques can be employed to fabricate models with a speed of over 10 mm/min, which can be faster than some existing high speed 3D printers including devices on the market using Continuous Liquid Interface Production (CLIP) technology developed by Carbon3D. Consequently, continuos resin flow based mask video projection can achieve ultra-high fabrication speed and Z resolution, and supports an improved 3D printing process over typical printing technologies.

Figure 1B:
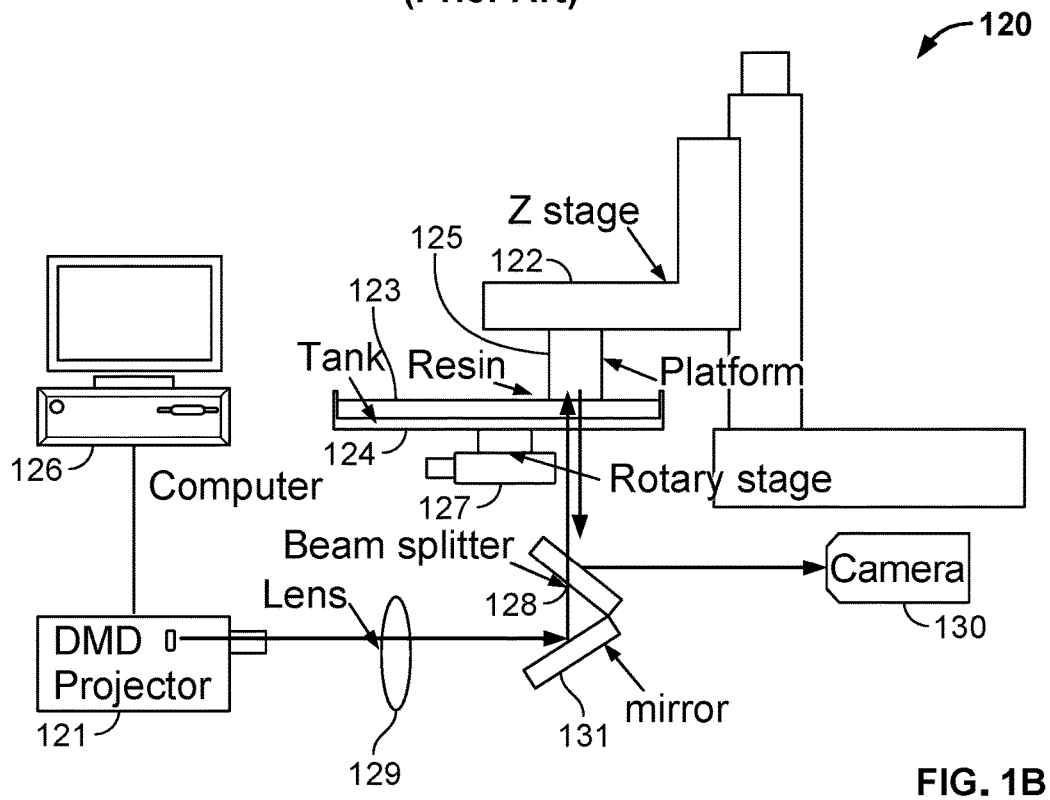
FIG. 1B shows an example of a system employed for implementing continuous resin flow based MVP-SLA techniques.

FIG. 1B shows an example of a mask video projection based stereolithography (MVP-SLA) system 120. The mask video projection based SLA process performed by MVP-SLA system 120 can be considered an extension of the mask image based SLA process, as described in relation to FIG.

1A, where the shape of a physical model can be fabricated by a video projections used to solidify sections of liquid resin 123, rather than a singularly projected image as in MIP-SLA. As an example, multiple mask images constituting a video are projected through the DMD projector 121 of the MVP-SLA system 120 at a determined video speed. According to some embodiments, the DMD projector 121 is configured to project video images at a rate ranging between 30-120 images/sec. The DMD projector 121 can emit light to convey the video images. As illustrated, the light then propagates from the DMD projector 121 to a lens 129 that can affect the focus of a light beam, and is subsequently reflected by mirror 131 to be directed towards a bottom surface of tank 124. The DMD projector 121, lens 129, and mirror 131 can operate according to various settings and/or configurations such as a projection distance, frame rate, and focus so as to achieve a desired quality of the projection image within a designated fabrication area of the tank 124. The high image projection frequency used during the mask video projection based fabrication process can be sustained by the continuous movement of a Z stage 122 and the tank 124, thereby producing a continuous resin flow. As illustrated, the system 120 includes two-motion stages for actuating mechanical movements of the tank 124 and platform 125 that can be characterized in a three dimensional coordinate system (i.e., X axis, Y axis, Z axis). A rotary stage 127 can be used to rotate the tank 124. The Therefore, the MVP-SLA apparatus 120 can be used to implement the continuous resin flow based mask video projection technology by integrating the mask video projection and continuous resin flow techniques described herein. Thus, the embodiments can realize a high-speed and high resolution AM device, such as a 3D printer.

FIG. 1B displays continuous resin flow MVP-SLA system 120 as a bottom-up mask video projection based SLA system, which can continuously fabricate layers without substantial delay associating with refilling of resin during recoating iterations. Accelerating the recoating process so as to realize increased building speeds of the MVP-SLA system 120 includes utilizing a continuously moving platform 125 and tank 124 in synchronized two-way movements. A set of experiments have been performed to determine the curing character of polymer. Based on the experiment results, the continuous resin flow based mask video projection process, according to the embodiments, has been optimized. To increase the fabrication speed and improve the resin surface quality, a relationship between recoating speeds and accumulation speeds has been determined. In addition to the hardware components shown in FIG. 1B, software aspects of MVP-SLA system 120 can be included to implement the continuous resin flow based mask video projection techniques. For example, continuous resin flow MVP-SLA software can be executed by computer 126 to generate a 3D computer-aided design (CAD) mode that is further translated into a high frequency mask video. Thereafter, the mask video can be emitted by DMD projector 121 to cure the liquid resin 123 and build, or manufacture, the desired physical model. Moreover, a continuous resin flow MVP-SLA software, which can run locally on computer 126, controls or otherwise configures movements of the tank 124 and the platform 125. In some implementations, a continuous resin flow MVP-SLA software can present a user interface (UI) employed for displaying, a 3D representation, such as a digital model or video images on a display device of the computer 126. Also, a continuous resin flow MVP-SLA software can be programmed to perform calculations and/or derive relationships necessary for determining optimizing parameters for simultaneous two-stage movement and continuous resin flow according to the embodiments.

The computer 126 can include a processor, which can be one or more hardware processors, which can each include multiple processor cores. Also, the computer 126 can include a memory, such as volatile and non-volatile memory, for example Random Access Memory (RAM) and Flash RAM. The computer 126 can further include various types of computer storage media and devices, which can include the memory, to store instructions of programs that run on the processor of the computer 126.

In some implementations, the continuous resin flow MVP-SLA system 120 can be configured to support monitoring of the fabrication process. For example, to support the fabrication monitoring capabilities, the system 120 includes components of the optical system that are designed to enable human eye observation of various aspects of 3D printing, such as viewing of the projection video image and the fabrication results, for instance. As shown in FIG. 1B, the system 120 includes a beam splitter 128 utilized for changing the direction of a light beam emitted from DMD projector 121 (e.g., projected video) and a camera 130 employed for observation of the video projection result. Accordingly, a simultaneous checking of the fabrication result can be achieved using the system 120, as the condition of the fabrication, for example an object on platform 125, can be captured by the camera 130. Further, images captured by the camera 130 can be subsequently communicated and shown on a display device connected to the system 120, for example a monitor of the computer 126.

The hardware components of continuous resin flow MVP-SLA system 120 can include various optical-based components, mechanical-based components, and the tank 124 that can be mechanically repositioned for continuous movement, that is rotational movement or linear movement. In comparison to the MIP-SLA apparatus (shown in FIG. 1A), the extended functionality of a continuously moving tank 124 and a much faster display rate for video images can characterize some improvements realized by the continuous resin flow MVP-SLA system 120.

Figure 2:
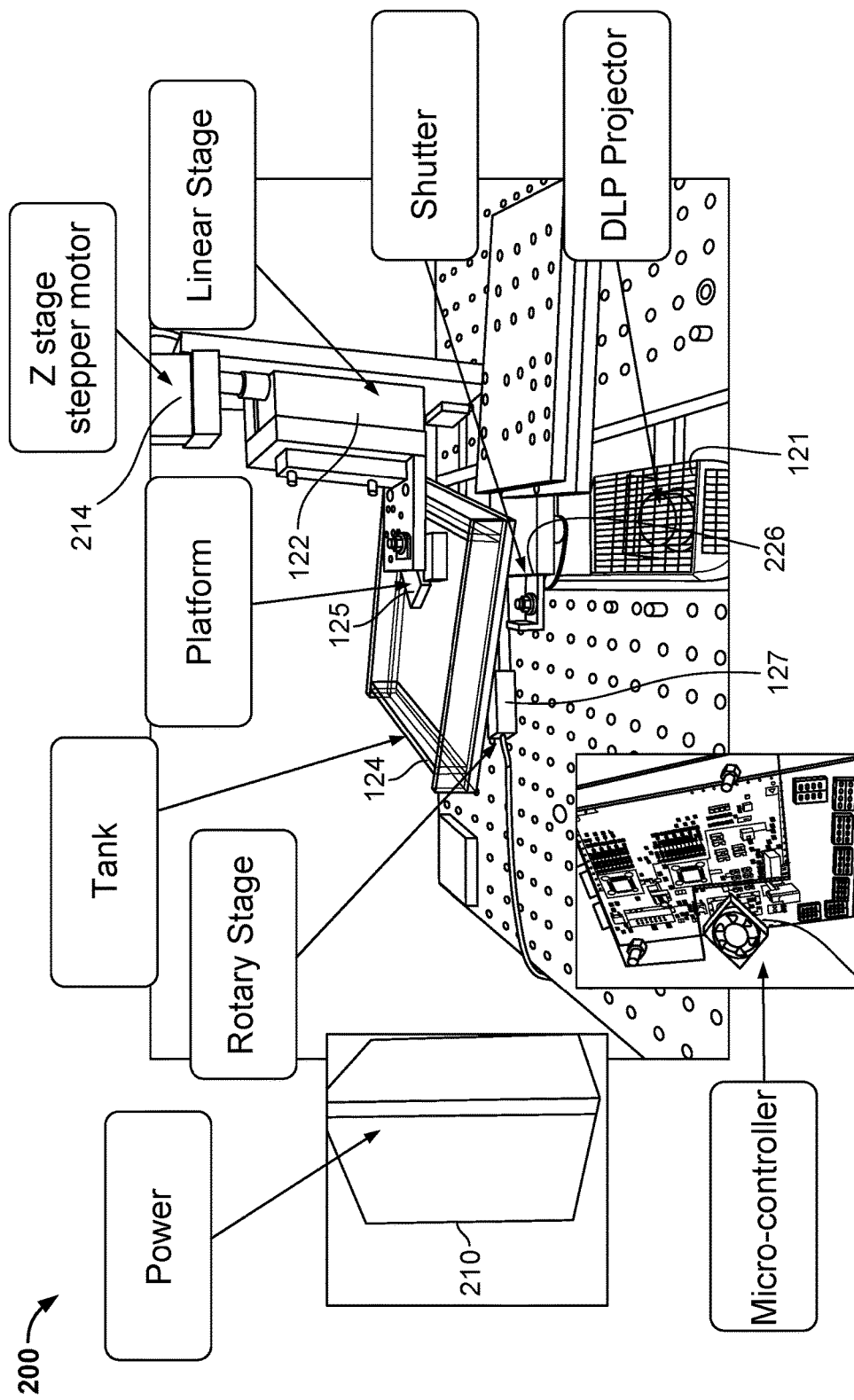
FIG. 2 shows a prototype physical system corresponding to FIG. 1A.

FIG. 2 shows a prototype physical system 200 corresponding to FIG. 1B. In this example, the system 200 has an optical design that can include a light lamb, a DMD chip, and a set of optical lenses. The power of the visible lamb used in the system 200 can be 3,000 lumen, whose illumination beam is collimated by a series of lenses. A Digital Light Projection (DLP) projector 121 can be implemented using Digital Micromirror Device (DMD) chip from Texas Instrument Co., and having a resolution of 1024×768, for example. The light, after transmitting through the lens, can have a focusing size of 50×37.5 mm. The light intensity of the focusing image can be approximately 30 mw/cm$^2$. In the example of FIG. 2, the laser optical components have the following parameters:

| Component | Key Parameters | Description |
|---|---|---|
| Visible Lamb | P = 190 w | Cure power |
| DMD Chip | Resolution = 1024 × 768 | Mask Video generator |
| Combination Lenses | F = 65 mm | Focus the light beam |

As illustrated in FIG. 2, there are two motion stages employed in system 200. A precise linear stage 122 (i.e., Z stage), such as components made available from Aerotech Inc. of Pittsburgh, Pa., is used as the elevator for driving the platform in the Z axis. A rotary stage 127, for example a stage made available from Velmex Inc. of Bloomfield, N.Y., is used to rotate the tank 124 for a forced fill of resin by accelerating the recoating speed. A high performance 4-axis motion control board with 28 bidirectional input/output (I/O) pins, made available from Dynomotion Inc. of Calabasas, Calif. is used for driving the linear stage 122, rotary stage 127, and shutter 226. In the example of FIG. 2, the laser optical components have the following parameters:

| Component | Key Parameters | Description |
| --- | --- | --- |
| Stepper DC motor | 200 Step 0.5 mm | Z stage |
| Rotary motor | 200 Step, 40.2°/sec 1.8° | Mask Video generator |
| Servo motor | 5 V PWM 0.6 ms-2.4 ms | Shutter |
| Micro-controller | 4 axis, 28 bidirectional I/O pin | Motion Controller |

For some existing MIP-SLA processes, it is difficult to separate the cured part of a manufactured product directly form the surface of the resin tank. To separate the cured layer from the tank, an approach using shearing force has been presented in U.S. Pat. No. 9,120,270 entitled "DIGITAL MASK-IMAGE-PROJECTION-BASED ADDITIVE MANUFACTURING THAT APPLIES SHEARING FORCE TO DETACH EACH ADDED LAYER", filed Apr. 29, 2013, which is incorporated herein by reference in its entirety. A microcontroller 212 can be employed as processsing device to execute code, for example firmware, that can be used to run and/or control operation of stage hardware and motorization, for example, of system 200. Additonally shown, Z stage stepper motor 214 can be included and used to mechanically drive the up and down movement of a translation stage (i.e., Z stage) that is attached to the platform 125. As an example, a Z stage stepper motor 214 can advance a stage upwards along a Z axis in fractions of a full height increments, or steps. Also, power 210 can be used to supply electrical energy to the various electromechanical components of the system 200.

Figure 3A:
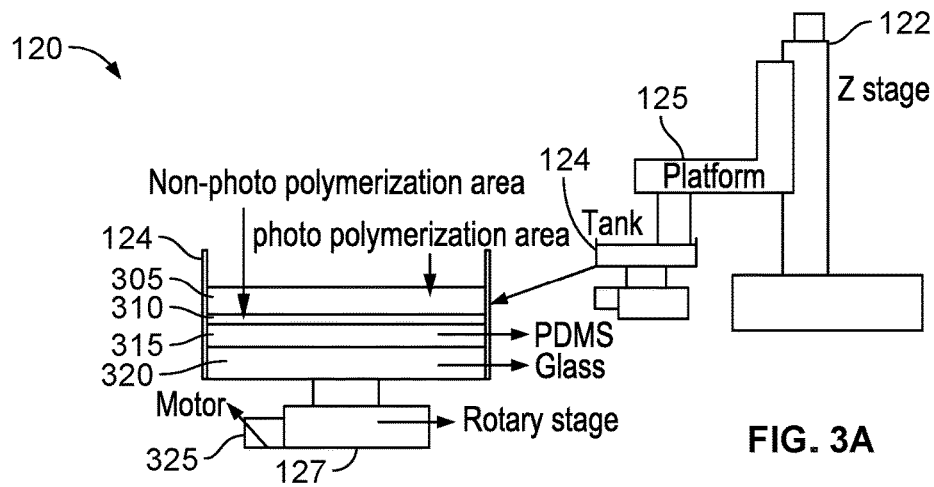
FIG. 3A shows an example of polymerization aspects of the MVP-SLA.

In an example of a setup for the continuos resin flow MVP-SLA system 120, as illustrated in FIG. 3A, a tank 124 can be made from a clear and flat material, for instance glass 320, and mounted on the rotary stage 127. Also, motor 325 can be used to mechanically drive movement of the rotary stage 127. For example, a linear translation of the rotary stage 127 can be elicited by rotary motion driven by motor 325. In some implementations, the motor 325 and rotary stage 127 allows a pivoting motion of tank 124. Additionally, the Z stage 122 can be coupled with the platform 125 to move the platform 125 in the Z dimension. For instance, the build platform 125 is raised vertically by the Z stage 122. Moreover, FIG. 3A shows that the surface, or glass 320 base of the tank 124 can be coated in a Polydimethylsiloxane (PDMS) film 315 (PDMS, Sylgard 184, Dow Corning). PDMS is a type coating material possessing certain properties during the polymerization process that cause an oxygen-aided inhibition near the PDMS surfaces to form chain-terminating peroxide radicals. In the process, a very thin oxygen inhibition layer is formed that can prevent the cured layer from attaching to the PDMS film 315. As an example, the PDMS film 315 is applied with a thickness of 2 mm at the bottom surface of the tank 124 coating the top of glass 320. The certain amount of oxygen on the coated PDMS layer 315 can prevent resin to be cured under the exposure. Hence, there can be a few microns thin layer of non-polymerization liquid resin 310 that remains layered between the PDMS film 315 and the cured part of resin, which is shown as the photo polymerization area 305. Therefore, the photo polymerization area 305, or the cured resin, can easily slide along the PDMS 315 of the resin tank 124 to detach each added layer of an AM product during fabrication, for example.

Experiments were performed to explore the best curing characteristics to be applied in the MVP-LA techniques described. In the experiments, a SI500 resin (yellow resin) made available from Envision TEC Inc. of Ferndale, Mich. was used as the liquid resin to test the continuous resin flow based MVP-SLA process. Based on the polymerization principle, the classical Beer Lambert's law of the light of propagation shows the cure depth follows the formula:

$$C_d = D_p \ln\left(\frac{E_{max}}{E_c}\right)$$

$E_{max}$ denotes the energy exposure, and $E_c$ represents the critical energy of resin.

The fabrication area of the continuous two-way movement MVP-SLA process can be 50×37.5 mm. Because the light intensity of the focus energy is 30 mw/cm², the exposure energy is controlled by the exposure time. Based on the material property and the energy distribution, the cure depth of resin, particularly the SI500, was calculated and the curing speed setting for the system 120 was determined to be approximately 150 μm/sec. Additionally, a series of experiments to determine the best continuous moving speed for the Z stage 122 were also performed, so as to explore the moving speeds resulting in the best surface quality. From the results of the experiments, it was determined that achieving the best Z moving speed for the system 120 settings is approximately 150 μm/sec, similar to the aforementioned calculated curing speed (e.g., ~150 μm/sec).

Figure 3B:
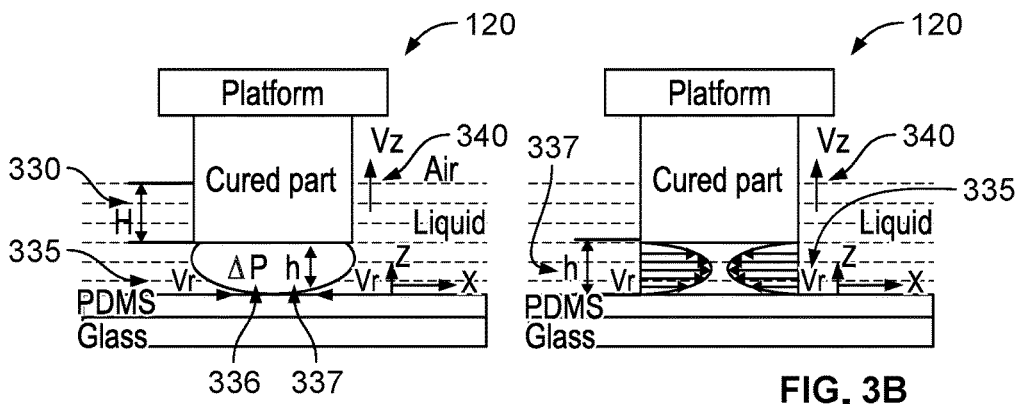
FIG. 3B shows an example of liquid filling implemented in a single stage continuous resin flow based MVP-SLA system.

To further examine operational settings for the MVP-SLA system 120, a relationship between recoating speeds and accumulation speeds has been determined. FIG. 3B shows an example of a continuous single movement (i.e., Z dimension) of the MVP-SLA system 120 to examine resin flow resulting from vertical movement only (e.g., without rotational movement). In the example, a standard atmospheric pressure $P_{air}$ can be assumed to be 101325 Pa. Other assumed values are used in the example, including but not limited to: a height of resin H 330 is as 10 mm, a viscosity of resin μ is 180 cP at 30° C., a change in pressure ΔP 336 (equal to the air pressure Pair add the pressure Pr generated by the weight of resin with the height of H in tank); a difference in height h(t) 337 between the PDMS layer and the cured part (dh/dt) is 50 um/s. The speed of filling resin, shown as $V_r$ 335, is 0.76 mm/s. A formula can be employed to calculate the value of $V_r$ 335 as shown below:

$$Vr = \frac{dx}{dt} = \left(\frac{\sigma \cos\theta}{6\mu}h(t) + \frac{\Delta p}{12\mu}h(t)^2\right) * \frac{1}{x}$$

Figure 3C:
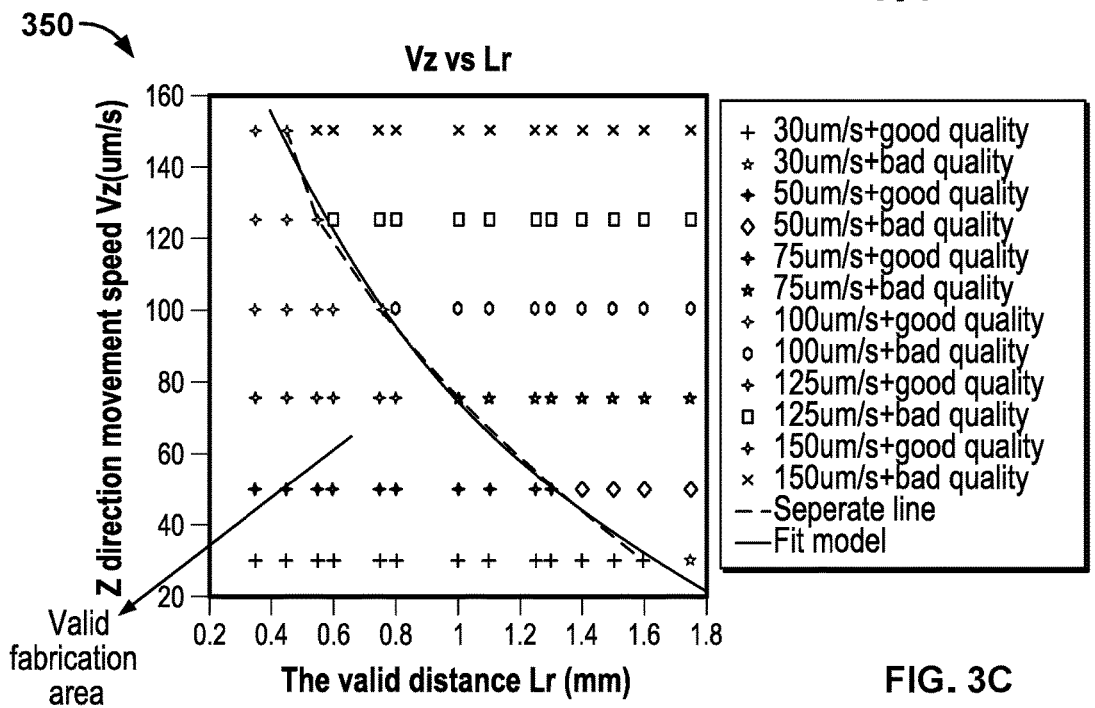
FIG. 3C shows an example of a graphical representation for a relationship between fabrication area and stage movement speed.

Based on the abovementioned calculation, the speed of filling resin under air pressure and the self-weight of resin is relatively small (e.g., 0.76 mm/s), which means the resin is able to cover micro-scale level areas during continuous movement in each direction (e.g., 760 μm/second). If the height of resin in tank is small (e.g., less than 10 mm), the self-filling speed of resin will turn to be smaller. Thus, under self-weight of resin and air pressure, employing continuous single movement techniques can fabricate micro-scale level features with sufficient resin filling. To verify this assumption, experiments to identify the relationship between the valid fabrication area δ and a speed of movement in the Z direction $V_z$ 340 were utilized. A series of squares were fabricated with different section areas from 0.01 mm² to 4 mm² with different moving speeds in z direction $V_z$ 340. A cured model with bubbles on its cross section area can be considered a failure case of the continuous fabrication using video projection, and if there are no bubbles and no resin intersections shadow in the middle, the results can be considered valid continuous fabrication result by video projection. These experiments resulted in data represented by graph 350 in FIG. 3C.

Based on the results of the experiment, critical values of fabrication distance Lr in different moving speed in Z direction from 30 um/s to 150 um/s can be determined. The relationship between fabrication distance Lr and Vz 340 are mathematically represented as shown below:

$$L_r = k_1 \frac{P}{\eta V_z^{k_2}}$$

where $L_r$ is half of the side length of the square, P is air pressure and η is the viscosity.

Based on the results, all the models within a valid fabrication area are capable of being fabricated using the active resin filling techniques, and can be visually characterized as points under the $V_z$ vs. $L_r$ line in the graph above. It can be determined that the moving speed in Z direction $V_z$ 340 is slower, and the valid fabrication area δ is larger. In instances when the cross section area A is bigger than the valid fabrication area δ in one speed level of Z movement, the bubbles will exist (e.g., failure) in the middle of the model and fresh liquid may not be able to fill the gap completely in time. That can indicate that more time for the resin refilling may be needed to the projection area, and further that slowing down of the fabrication speed may be necessary. In order to fabricate the cross section area A larger than 2 mm, the Z direction movement speed can be approximately 5 um/s. However, in order to achieve a fast continuous fabrication based on MVP-SLA process, it can be desirable to quickly fill a sufficient amount of resin beyond the fabrication area and into other areas of the tank. To solve this problem, refilling flow of the resin pushed by the gravity of the resin and air pressure is not solely relied upon, but is supplemented with the two-way movement of the continuous resin flow MVP-SLA techniques described.

Figure 4A:
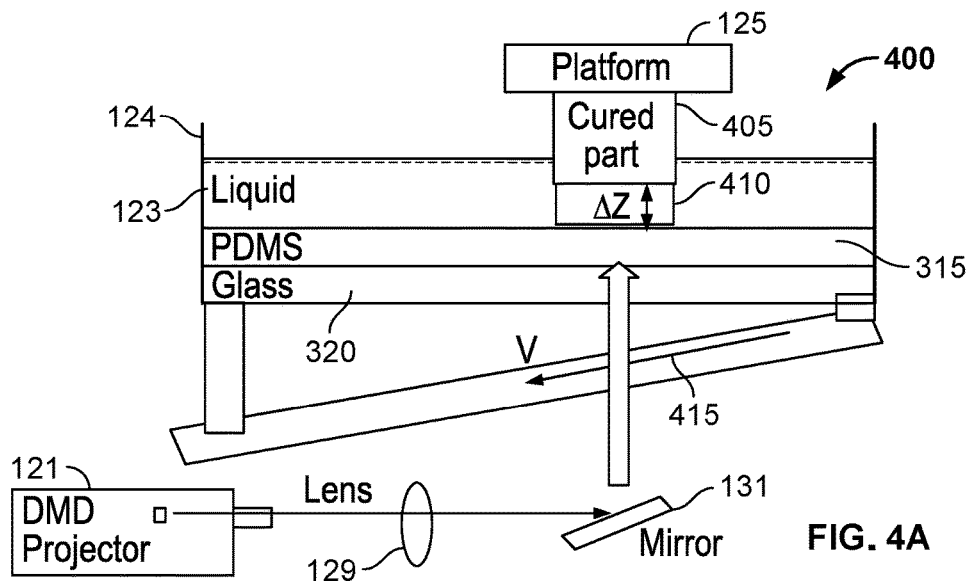
FIGS. 4A and 4B show examples of liquid filling implemented in a two-stage continuous resin flow based MVP-SLA system.

FIG. 4A shows an example of continuous two-way movement employed for recoating by the continuous resin flow MVP-SLA system 400. In some existing recoating methods for MIP-SLA systems, the process involves waiting for the resin to fill the fabrication area by gravity and surface tension after fabricating one layer. The process of passive or gravity forced resin flow takes time especially for a model with large cross section areas. The recoating technique employed by the continuous resin flow MVP-SLA system 400 addresses this problem of delays associated with recoating by implementing movement to actively effectuate resin flow, by using side motion of the AM device for instance. As illustrated in FIG. 4A, when the stage coupled with the tank 124 moves in an X dimension, for example movement to the left or right, the tank 124 resultantly moves in the specific direction at an associated speed V 415 (e.g., $V_x$). As a result, the liquid resin 123 fills the gap between the cured part 405 of resin forming the manufactured product and the PDMS layer 315 with corresponding speed in the horizontal direction along the X dimension. Also, simultaneously, the Z stage performs movement that elevates the platform 125 at a vertical elevation difference from its original position AZ 410 and at a set speed in the Z direction (e.g., $V_z$). Thus, the system 400 functions to perform a two-way movement of the tank 124 and correspondingly the liquid resin 123. The sliding movement in the X axis can accelerate the resin flow to ensure that there is sufficient resin to support continuous image projection, as in mask video techniques described. Hence, the MVP-SLA system 400 is configured to employ two-way movement, in which the Z stage continuously moves up in the Z dimension with sufficient curing depth, and at the same time, the linear stage on which the tank 124 is mounted, continuously moves in the X dimension or the Y dimension with suitable distance according to the size of the model. During the continuous resin flow process, the movement is performed in such a manner that there is no relative motion between the platform 125 and the DMD projector 121. Therefore, the physical model can be fabricated with the continuous projection speed.

Figure 4B:
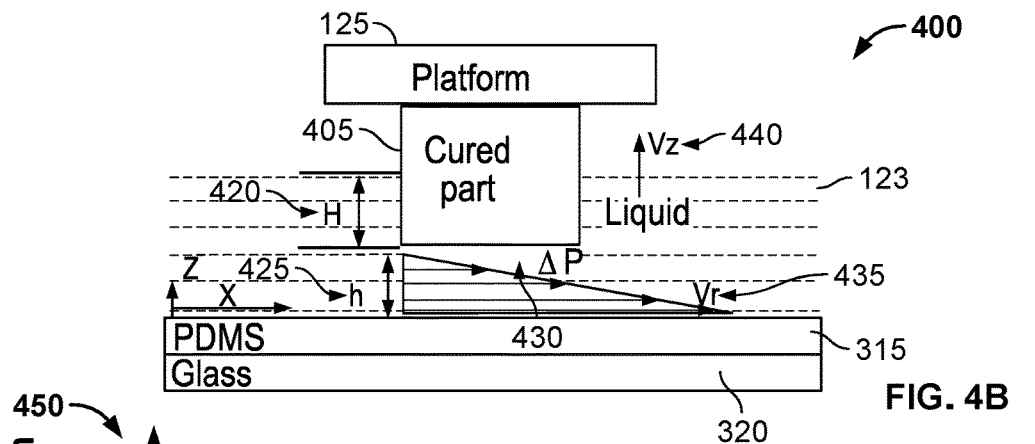

FIG. 4B shows an example of a continuous two-way movement of the MVP-SLA system 400 to examine resin flow resulting from dual-movement of two stages. As illustrated in FIG. 4B resin refilling in two stages movement can be examined by analyzing the velocity component in X direction and Z direction, $V_z$ 440. $V_r$ 435 represents the recoating speed in two stages movement design, which is equal to the sum of the rotation tank speed in tangent direction $V_x$ (not shown) and the recoating speed of resin $V_{rg}$ under air pressure and self-gravity. Also, a change in air pressure ΔP 430 between the cured part and the liquid resin of the refilling flow is illustrated. An angular velocity can be associated with rotational movement (e.g., rotary tank) and characterized as ω (0,0,ω), and then the recoating speed $V_r$ 435 of liquid filling in continuous resin liquid flow process can be determined as shown below:

$$V_r = V_x + V_{rg} = \omega r + V_{rg}$$

Although movement is performed, and subsequently analyzed, in the X direction movement, the refilling flow still can be regarded as isothermal, incompressible fluid. Since the surface of platform 125 is parallel with the surface of PDMS 315 and the glass 320, then the flow around cured part 405 is stable and without turbulence. Thus, filling flow between the cured part 405, which is at a height H 420 to the surface of the liquid resin 123, and PDMS 315 can be considered as Taylor-Couette flow at a height h 425. Along with the fresh liquid resin streams through the channel between the cured part 405 and PDMS 315, the photo-curing process is performed in a manner such that the viscosity of liquid increases exponentially. In the layerless additive manufacturing processes with video projection, the liquid is exposed to the light during its filling process and hence the viscosity increases due to the photo-polymerization. Viscosity increases exponentially with monomer conversion. D. Rosendale and J. A. Biesenberger, "Rheokinetic Measurements of Step- and Chain-Addition Polymerizations". Polymer Characterization, 1990 (16):267-28; Caroline R. Szczepanskia, Carmem S. Pfeiferb, and Jeffrey W. Stansbury, "A new approach to network heterogeneity: Polymerization Induced Phase Separation in photo-initiated, free-radical methacrylic systems". Polymer (Guildf). 2012; 53(21): 4694-4701. To illustrate the filling dynamics in photopolymerization process, a simplified exponential function to describe the viscosity profile of the liquid in the gap can be used as shown below:

$$\eta_t = \eta_0 \times e^{kt}$$

where $\eta\_t$ and $\eta\_0$ are the viscosities at time t and time 0, respectively, k is a constant.

An ideal filling speed in X direction is shown below:

$$Vx = \frac{\partial x}{\partial t} = \frac{dp}{dx} \cdot \frac{h^2}{4\delta} = \left(\frac{\sigma \cos\theta}{2\delta} * V_z + \frac{\Delta P}{4\delta} * V_z^2\right) * L_{xmax}$$

where p, $\sigma$, $V_z$, $\delta$ is the pressure, surface tension, the velocity of resin and viscosity of resin.

Experiments were applied to optimize the two-way movement parameter settings of the MVP-SLA system 400, and to identify the relationship between the valid fabrication area $\delta$ and the movement speed in the X dimension, $V_x$ of the rotary stage for example, and the speed of movement in the Z dimension $V_z$ 440, of the Z stage. In the two-way movement system, the liquid filling in the X movement direction is considered, which means the maximum projection distance of the object in X direction $L_{xmax}$ can be used to represent the valid fabrication area $\delta$. A set of experiments was designed to calibrate the minimum move speed in X direction $V_x$ required to accomplish the flow filling in the entire building area. Experimentation included fabricating a series cones with different section areas, and the range of diameters are from 8 mm to 35 mm with different move speed of the rotary stage at speed $V_x$. In instances where the built part possesses holes or deep shadows in the surface, the movement speed in X direction $V_x$ was considered insufficient, and the cured model with bubbles in cross section area is regarded as failure case for the continuous fabrication using video projection. Accordingly, an increased $V_x$ can be applied to rebuild the part, and if bubbles and resin intersections shadow are eliminated, the result was considered valid movement in continuous fabrication by video projection. The building process was repeated until the biggest section area of the cone part is void-free. Since there is a boundary on the surface of cone separating the cone with void-free area and void area, it is possible to trace back to find the critical void-free curing section area Ax with movement speed in X direction $V_x$. In this way, given the Z movement speed $V_z$, the critical movement speed in X direction $V_x$ can be identified according to different maximum projection distance ($L_{xmax}$). Based on the experiments, a set of data was collected. And further based on this data, a mathematical model to calculate the critical movement speed in X direction for the generation of continuous liquid flow was determined, and is shown below.

$$V_{xmin} = \frac{(k_3 V_Z + k_4 V_Z^2) * L_{xmax}}{\eta}$$

Furthermore, high speed brings large shear force because of the viscosity of liquid. While increasing the speed of rotary enables a larger area for fabrication (based on the identified relationship between fabrication area and movement speed of the rotary stage), it may be preferable for the small features on the object to be fabricated without being cut off by large shear force. To identify the maximum speed, a bar with different section area was fabricated to determine the maximum speed that can be endured without damaging, or otherwise altering the intended geometry of the manufactured product. Based on the experimentation, it was determined that as the speed in X direction movement Vx increases, the surface quality of the objects tend to be worse, and even some portion was damaged by the large shear force. The data resulting from the experiments was analyzed and fitted to a mathematical model to calculate a critical maximum speed for each projection distance $L_{xmax}$ to avoid damaging the surface of objects, and as shown below.

$$V_{xmax} = \frac{Fb L_{xmax}^3}{6h\eta} = k_5 L_{xmax}^3 \left(k_5 = \frac{Fb}{6h\eta}\right)$$

Figure 4C:
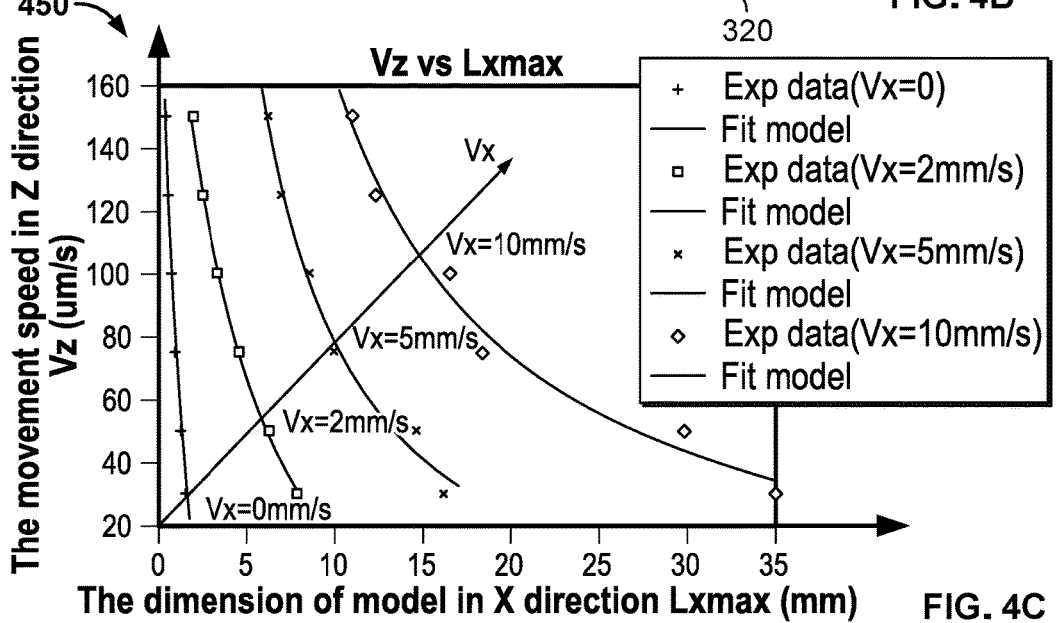
FIG. 4C shows another example of a graphical representation for a relationship between fabrication area and stage movement speed.

Moreover, the abovementioned experiments regarding valid fabrication area $\delta$ resulted in data represented by graph 450 in FIG. 4C.

Additonally, based on the results, it can be observed that: when the $Vx<V_{xmin}$, the object was fabricated without sufficient resin; when $Vx>V_{xmax}$, the object isn't fabricated perfectly; when $V_{xmin}<Vx<V_{xmax}$, there is no damage and bubbles in the objects and the surface quality of the object is smooth.

The minimum movement speed in X direction Vx increases with the maximum projection distance of the object in X direction $L_{xmax}$ at the same movement speed in Z direction Vz, while bigger movement speed in Z direction Vz results in larger minimum movement speed in X direction Vx to fabricate the object at the same $L_{xmax}$. With the increasing of the movement speed in X direction Vx, the valid fabrication area tends to be bigger.

It is found that when the dimensional $L_{xmax}$ x is in the range of (0 mm, 1.5 mm) and the movement speed in Z direction is no larger than 100 um/s, there is no necessity to add another movement. The resin has already filled the gap completely when the z stage moving up process was done. But the valid fabrication area is so small that it only can cover the micro-scale fabrication. For macro-scale cases, the minimum speed in X direction movement can be approximated by the fitted model, which is built with the corresponding calibration results. If the Vx is larger than 10 mm/s, the Vz is bigger than 100 um/s; the valid fabrication area with the continuous liquid flow is ten times the one without the two-way movement design.

Figure 5A:
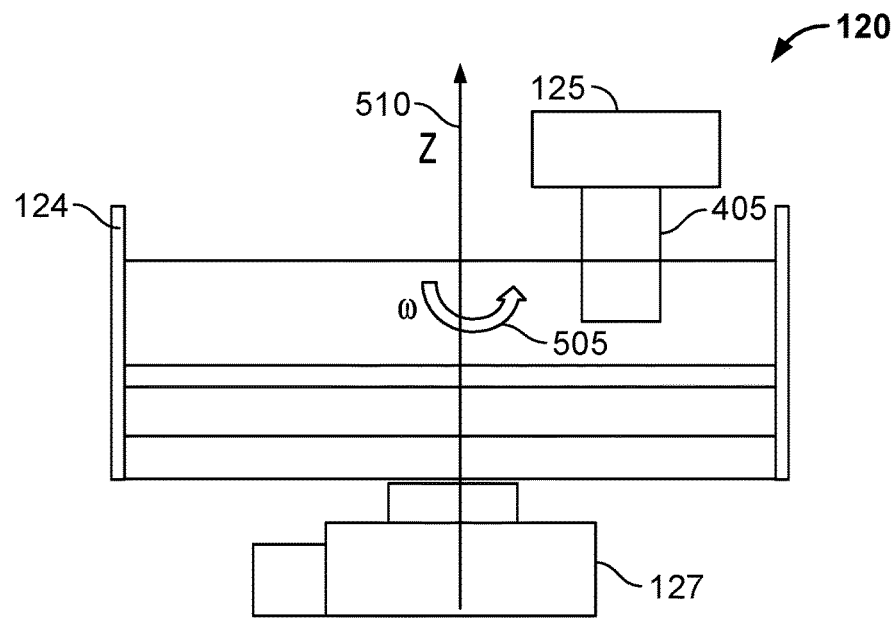
FIGS. 5A & 5B show other examples of liquid filling implemented in a two-stage continuous resin flow based MVP-SLA system.

FIG. 5A shows an additional example of continuous resin filling according to two-way movement employed by the MVP-SLA system 120. The MVP-SLA system 120 is illustrated in FIG. 5A as a rotation tank 124, that is tank 124 is coupled with a rotary stage 127, and accordingly the movement speeds of a rotation tank 124 can be changed based on the distance between the center of the rotary stage 127 and the position of platform 125. Also, the platform 125 supports a cured part 405, or portions of an AM part during building according to the continuos resin flow techniques. Thus, an angular velocity $\omega$ 505 can be considered as the speed of a rotational movement, or rotation speed, that is associated with the rotary stage 127. Furthermore, movement in the Z dimension, shown as Z 510 can be performed simultaneously with movement of the rotation tank 124.

Figure 5B:
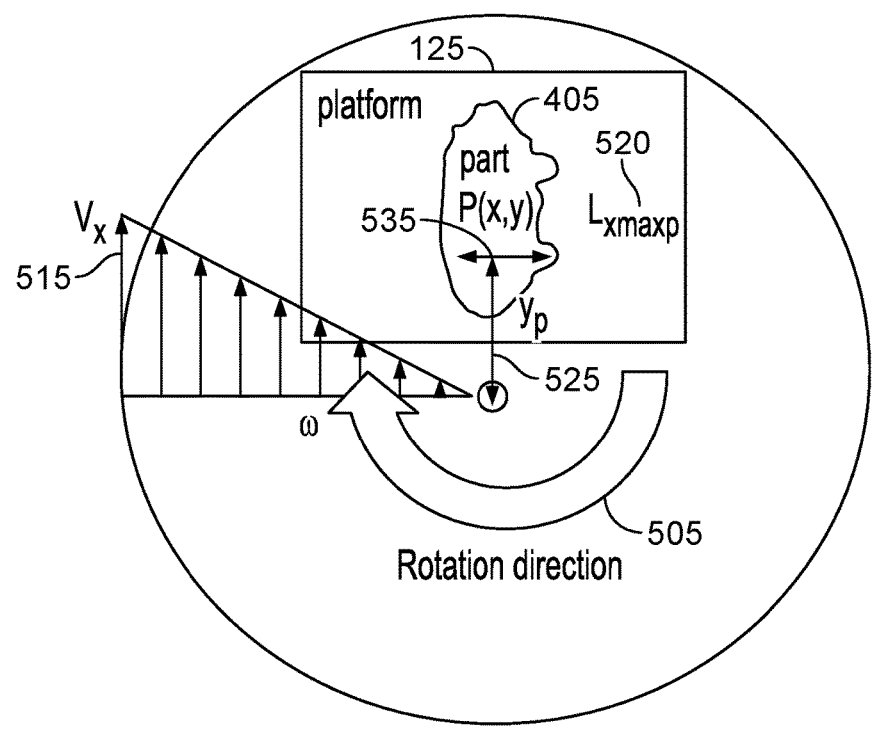

FIG. 5B shows an example of a relationship between the rotation speed and the position of the part 405. For a rotation tank implementation of the MVP-SLA system (shown in FIG. 5A), the associated speed distributed based on the two-way movement can be analyzed. For example, when angular velocity $\omega$ 505 is set as a constant, the rotation speed (the recoating speed) increases gradually with the distance away from the central point. The rotation speed can satisfy the requirement that the recoating speed is able to cover the whole fabrication area of the part 405. The experiments show that shear force proportional increase is consistent with the angular velocity ω 505. Based on the geometries of the part 405, shown in FIG. 5B as $L_{xmaxp}$ 520, the global maximum and minimum rotation speed $V_{xmax}$ and $V_{xmin}$ relating to the rotational tank speed in a tangent direction Vx 515 can be calculated. Thereafter, the maximum radial distance $y_p$ 525 of each point P(x,y) 535 in radial direction can be calculated. Moreover, the maximum and minimum angular velocity ω*505 of the rotation stage $$\frac{V_{xmin}}{y_p} \leq \omega^* \leq \frac{V_{xmax}}{y_p}$$

can be calculated. Based on experiments and theory analyses, the optimal position of the part with the ideal angular velocity ω*505 can be determined.

To further optimize operational settings relating to two-way movement of the rotational tank implementation of the MVP-SLA system (shown in FIG. 5A), relationships between sizes of models and the angular velocity ω 505 were examined, as well as relationships between Z stage speed Vz and the angular velocity ω 505. For experimentation, projection patterns were designed using the Design of Experiment (DOE) method so as to determine optimization of the two-way movement setting. These experiments resulted in data that is described in U.S. Provisional Application Ser. No. 62/181,632, entitled "MASK VIDEO PROJECTION BASED STEREOLITHOGRAPHY WITH CONTINUOUS RESIN FLOW FOR BUILDING DIGITAL MODELS IN MINUTES", filed Jun. 18, 2015, which is incorporated herein by reference in its entirety.

Figure 6:
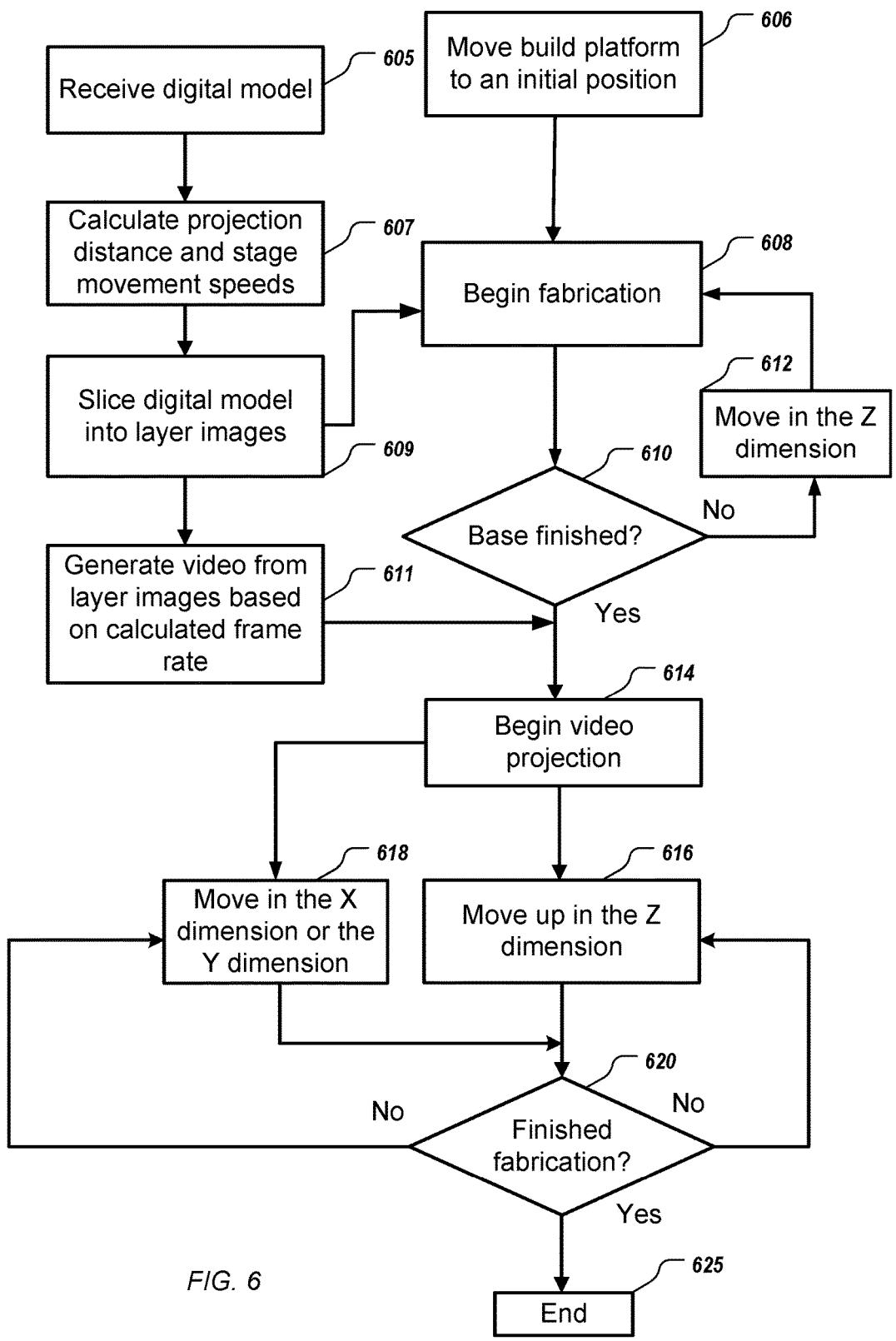
FIG. 6 shows an example of a process employed in part fabrication using two-stage continuous resin flow based MVP-SLA.

FIG. 6 shows an example of a process employed for performing continuous resin flow MVP-SLA based techniques in fabrication of an AM built object. A digital model can be received 605, which can be a representation of a physical object to be replicated using AM technology, such as 3D printing. Receiving the digital model can involve creating a computer-generated 3D model, for example a 3D model that can be modified using CAD software. In some implementations, a digital model of a scanned product can be received from another device such as a 3D scanner, for example.

Subsequently, calculations can be performed 607 so as to determine various operational settings to further configure a MVP-SLA system to function in accordance with the continuous resin flow techniques described. As an example, calculations can include, but are not limited to, calculating a maximum projection distance and movement speeds for mechanical stages (e.g., rotary stage and Z stage). Calculating a maximum projection distance can include deriving a maximum projection distance in the X direction, $L_{xmax}$, which can be associated with emitting light at a distance to ensure that cured portions of the liquid resin are fabricated in a valid fabrication area of the tank. Calculating a maximum projection distance $L_{xmax}$ can be achieved using algorithms and techniques as described in reference to FIG. 4B. Furthermore, based on the calculated maximum projection distance, additional calculations can be made including an acceleration speed for a first translation stage (e.g., rotary stage), an acceleration speed for a second stage (e.g., Z stage), and a stable speed. The calculated values are derived to ensure that simultaneous two-way movement of a MVP-SLA device is suitable for the desired results. For instance, critical movement speeds for the rotary stage in the X dimension (e.g., $V_{xmin}$) and for the Z stage in the Z dimension (e.g., $V_{zmin}$) can be calculated to safeguard against disruption of the continuous flow of the liquid resin during fabrication. Moreover, the calculations can consider the relationships between various operational aspects, such as the relationship between a valid fabrication area and the accelerating speed of the translation stages and the relationship between rotation speed and the position of the cured part. In some embodiments, an angular velocity is also calculated for controlling speed in rotational movement of a rotary stage. Calculating the movement speeds for translation stages can be achieved using algorithms and techniques as described in reference to FIG. 4B and FIG. 5B.

Thereafter, the digital model can be further processed so as to slice the digital model into a plurality of images corresponding to several cross sectional layers 609 according to a predesignated thickness for each layer. In some implementations, each of the respective layers are sliced to the same thickness. Thus, a MVP-SLA device can construct each layer sequentially during fabrication. Each layer's construction can be analogous to printing of an image with a particular thickness, or volume. Therefore, after all layers have been fabricated during recoating MVP-SLA device, a manufactured object can be produced with the same dimensions as the digital model.

As an example, the digital model can be sliced into thousands of layers images based on a desired accuracy (e.g., less defects) for the manufactured part. Subsequently, according to the acceleration speed and stable speed, these sliced images are combined to generate a video 611 used in the fast mask video projections techniques described. The video can be generated with different frame rates $F_v$ to account for the corresponding movement of the MVP-SLA, which means at an acceleration period, the frame rate of the projected video image is lower than projections in the stable period due to the same slice thickness. The formula of the calculated frame rates, $F_v$ is shown below:

$$F_V = \begin{cases} \dfrac{at}{Z_{thickness}} & \left(t \leq \dfrac{V_Z}{a}\right) \\ \dfrac{V_Z}{Z_{thickness}} & \end{cases}$$

Various initialization procedures can be performed prior to the start of physical fabrication of a AM built object, for example movements can be performed by the MVP-SLA device to calibrate or otherwise arrange components of the device for optimized two-way movement. As shown in FIG. 6, the build platform can be moved to an initial position 606 within the resin tank. The initial position can be associated with positioning the cured part of the object in an optimized fabrication area based on the calculated stage movement speeds. Then, fabrication of the 3D printed part can be begin 608. A beginning of the fabrication process can further include powering mechanical controls (e.g., motors) to initiate simultaneous two-way movement of both translation stages at a starting speed to start a continuous movement of the liquid resin. Fabrication can begin with curing a base, or bottom portion, of the part.

After start of the fabrication process, a condition 610 can determine whether the construction of a base is finished. In the instance when the base is not finished, shown in FIG. 6 as "No", the process can continue fabrication, for example performing additional recoatings of any cured parts of the partially formed based by performing movement in the Z dimension 612. The movement can be performed by the Z stage that is coupled with a platform, thereby elevating the platform during continued fabrication 608. This process of coating and movement in the Z direction can be iteratively performed until a base is completed. Conversely, when the base has been fully fabricated, "Yes", projection of the video can begin 614. Projecting mask video can include conveying light representing the generated video images at the calculated frame rate through optical components of a MVP-SLA device, for instance a DMD projector. Thereafter, two-way movement of the tank can be performed to cause continuous flow of the liquid resin to recoat and further cure portions of the fabricated part. As shown in FIG. 6, the tank can be moved up in the Z dimension 616 and simultaneously moved in the X dimension, Y dimension, or both, 618. As an example, after curing a first layer of liquid resin on top of the formed base, a linear stage can move in the Z direction and simultaneously the rotary stage can translate the tank in a sliding motion to refresh the liquid resin and prepare the next layer of the part. The two-way movement and recoating process performed during fabrication can be repeated until the entire part is completely fabricated. Thus, a condition 620 can be employed to determine whether the part is entirely fabricated. If "No", then additional layers of the part remain, and the two-way movement, resin flow, and curing can be iratively accomplished for the other layers that are projected until the part is finished fabrication. The process ends at step 625.

The processes described above, and all of the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e.g., a computer) to perform the operations described. It will be appreciated that the order of operations presented is shown only for the purpose of clarity in this description. No particular order may be required for these operations to achieve desirable results, and various operations can occur simultaneously or at least concurrently. In certain implementations, multitasking and parallel processing may be preferable.

The various implementations described above have been presented by way of example only, and not limitation. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, the principles, elements and features described may be employed in varied and numerous implementations, and various modifications may be made to the described embodiments without departing from the spirit and scope of the invention. Accordingly, other embodiments may be within the scope of the following claims.

What is claimed is:

1. A system for additive manufacturing of an object in three dimensions consisting of an X dimension a Y dimension and a Z dimension, the system comprising:
  a tank configured to contain a liquid resin, the tank comprising a window in a bottom portion of the tank;
  a first translation stage coupled with the tank, the first translation stage being configured to move the tank in the X dimension, the Y dimension, or both;
  a build platform configured to be located within the tank for at least an initial portion of building a part;
  a second translation stage coupled with the build platform, the second translation stage being configured to move the build platform in the Z dimension;
  a light projection device configured to emit light through the window and into the tank to cure the liquid resin; and
  a computer control system comprising at least one hardware processor and a storage device coupled with the hardware processor, the computer control system being coupled with the first translation stage to control movement of the tank, the computer control system being coupled with the second translation stage to control movement of the build platform, the computer control system being coupled with the light projection device to control emission of the light, and the storage device encoding a program configured to cause the computer control system to
  cause the light projection device to emit the light into the tank to cure the liquid resin to manufacture the part on the build platform,
  cause the first translation stage to perform a sliding motion of the tank simultaneously with causing the light projection device to emit the light into the tank, and
  cause the second translation stage to elevate the build platform in the Z dimension simultaneously with causing the first translation stage to perform the sliding motion.

2. The system of claim 1, wherein the sliding motion of the tank and the elevation of the build platform are both performed as continuous motion synchronized with each other, and the program is configured to cause the computer control system to emit the light in a video projection process while allowing no relative motion between the build platform and the light projection device in either the X dimension or the Y dimension.

3. The system of claim 2, wherein the light projection device comprises a Digital Micromirror Device (DMD).

4. The system of claim 2, wherein the video projection process operates at a rate of 30-120 images per second.

5. The system of claim 2, comprising a beam splitter and a camera.

6. The system of claim 2, wherein the continuous motion is synchronized using a first translation speed corresponding to the sliding motion of the tank and a second translation speed corresponding to the elevation of the build platform, wherein the speeds are calculated based on a maximum projection distance associated with the emitted light.

7. The system of claim 1, wherein the first translation stage is configured to rotate the tank, thereby causing movement of the tank in both the X dimension and the Y dimension.

8. The system of claim 6, wherein the tank is sized and positioned to place a region where the part is manufactured outside of a center region of the tank.

9. The system of claim 1, wherein the window comprises glass and a layer of polydimethylsiloxane (PDMS) thereon.

10. A system for additive manufacturing of an object in three dimensions consisting of an X dimension, a Y dimension, and a Z dimension, the system comprising:
- a tank configured to contain a liquid resin, the tank comprising a window in a bottom portion of the tank;
- a first translation stage coupled with the tank, the first translation stage being configured to move the tank in the X dimension, the Y dimension, or both;
- a build platform configured to be located within the tank for at least an initial portion of building a part;
- a second translation stage coupled with the build platform, the second translation stage being configured to move the build platform in the Z dimension;
- a light projection device configured to emit light through the window and into the tank to cure the liquid resin; and
- a computer control system comprising at least one hardware processor and a storage device coupled with the hardware processor, the computer control system being coupled with the first translation stage to control movement of the tank, the computer control system being coupled with the second translation stage to control movement of the build platform, the computer control system being coupled with the light projection device to control emission of the light, and the storage device encoding a program configured to cause the computer control system to
- cause the light projection device to emit the light into the tank to cure the liquid resin to manufacture the part on the build platform,
- cause the first translation stage to perform a sliding motion of the tank simultaneously with causing the light projection device to emit the light into the tank, and
- cause the second translation stage to elevate the build platform in the Z dimension simultaneously with causing the first translation stage to perform the sliding motion;
- wherein the sliding motion of the tank and the elevation of the build platform are both performed as continuous motion synchronized with each other; and
- wherein the continuous motion is synchronized using a first translation speed corresponding to the sliding motion of the tank and a second translation speed corresponding to the elevation of the build platform, wherein the speeds are calculated based on a maximum projection distance associated with the emitted light.

11. The system of claim 10, wherein the light projection device comprises a Digital Micromirror Device (DMD).

12. The system of claim 10, wherein the program is configured to cause the computer control system to emit the light in a video projection process that operates at a rate of 30-120 images per second.

13. The system of claim 10, comprising a beam splitter and a camera.

14. The system of claim 10, wherein the first translation stage is configured to rotate the tank, thereby causing movement of the tank in both the X dimension and the Y dimension.

15. The system of claim 14, wherein the tank is sized and positioned to place a region where the part is manufactured outside of a center region of the tank.

16. The system of claim 10, wherein the window comprises glass and a layer of polydimethylsiloxane (PDMS) thereon.

* * * * *